United States Patent [19]
Baller

[11] 4,034,890
[45] July 12, 1977

[54] BREAD BOX

[76] Inventor: Albert H. Baller, Box 146, Clinton, Mass. 01510

[21] Appl. No.: 753,581

[22] Filed: Dec. 15, 1976

[51] Int. Cl.² ............... B65D 43/14; B65D 51/04
[52] U.S. Cl. ................................ 220/334; 312/351
[58] Field of Search ............... 220/334; 229/14 B; 312/319, 333, 351; 206/45.13, 45.14

[56] References Cited
U.S. PATENT DOCUMENTS 2,024,010  12/1935  Muckler ................. 220/334 X
3,051,367  8/1962  Einhorn ................... 229/14 B Primary Examiner—George T. Hall
Attorney, Agent, or Firm—Charles R. Fay

[57] ABSTRACT

A food safe, e.g., a bread box, having a movable door for closing the same and an elevated floor for supporting the food, e.g. bread, in the safe or box, wherein an edge of said floor contacts said closure when the same closes the safe or box so that the operator can tuck an end of the plastic or paper wrapper of the food or bread underneath the floor and have it substantially sealed by contact with the closure.

3 Claims, 2 Drawing Figures

BREAD BOX

BACKGROUND OF THE INVENTION

Bread loaves usually are sold in plastic or paper wrappers the open end of which is usually closed by a twisted strip of wire or plastic clip or similar device. Reapplying these strips or clips after removing a slice of bread is a chore which must however be observed to keep the bread fresh. This is usually rather difficult and it cannot be done quickly and easily by most people.

It is the object of this invention to do away with such strips, clips, etc., and to form or construct the bread box itself in such a way that it is very easy to seal off the plastic or paper wrappers inside the bread box.

SUMMARY OF THE INVENTION

The food safe or bread box forming the subject matter of the present invention is provided with top, sides, rear and a floor together with a front opening having a hinged door or closure. In this case the floor is shown as fixed at an angle to the plane of the top of the box and it inclines downwardly towards the rear from the opening. The edge of this floor is raised above the normal floor (the normal floor may be omitted if desired) but the forward edge of the inclined floor abuts in sealing relationship to the inside surface of the closure as it is moved to position to close the opening. Any kind of lock, magnet, or otherwise may be used as is well-known in the art in order to hold the door closed.

The operator puts the loaf of bread in the box with the excess end of the plastic or paper wrapper extending forwardly thereof at the open end of the box; and this end is tucked under the inclined floor and the bread box is then closed. This action effectively pinches the plastic or paper wrapper adjacent the open end thereof and seals the bread in the wrapper thus reserving the freshness thereof for a considerable length of time.

The new floor is raised above the lower ends of the door and side members to provide a pocket receiving the tucked-in open and of the wrapper.

PREFERRED EMBODIMENT OF THE INVENTION

To illustrate the present invention, any kind of food safe, e.g., bread box, of simple and well-known general design is provided with a top 10, side walls 12,14, a floor 16 which may be present or may be omitted as well be become apparent hereinafter, and a full front opening.

Figure 1:
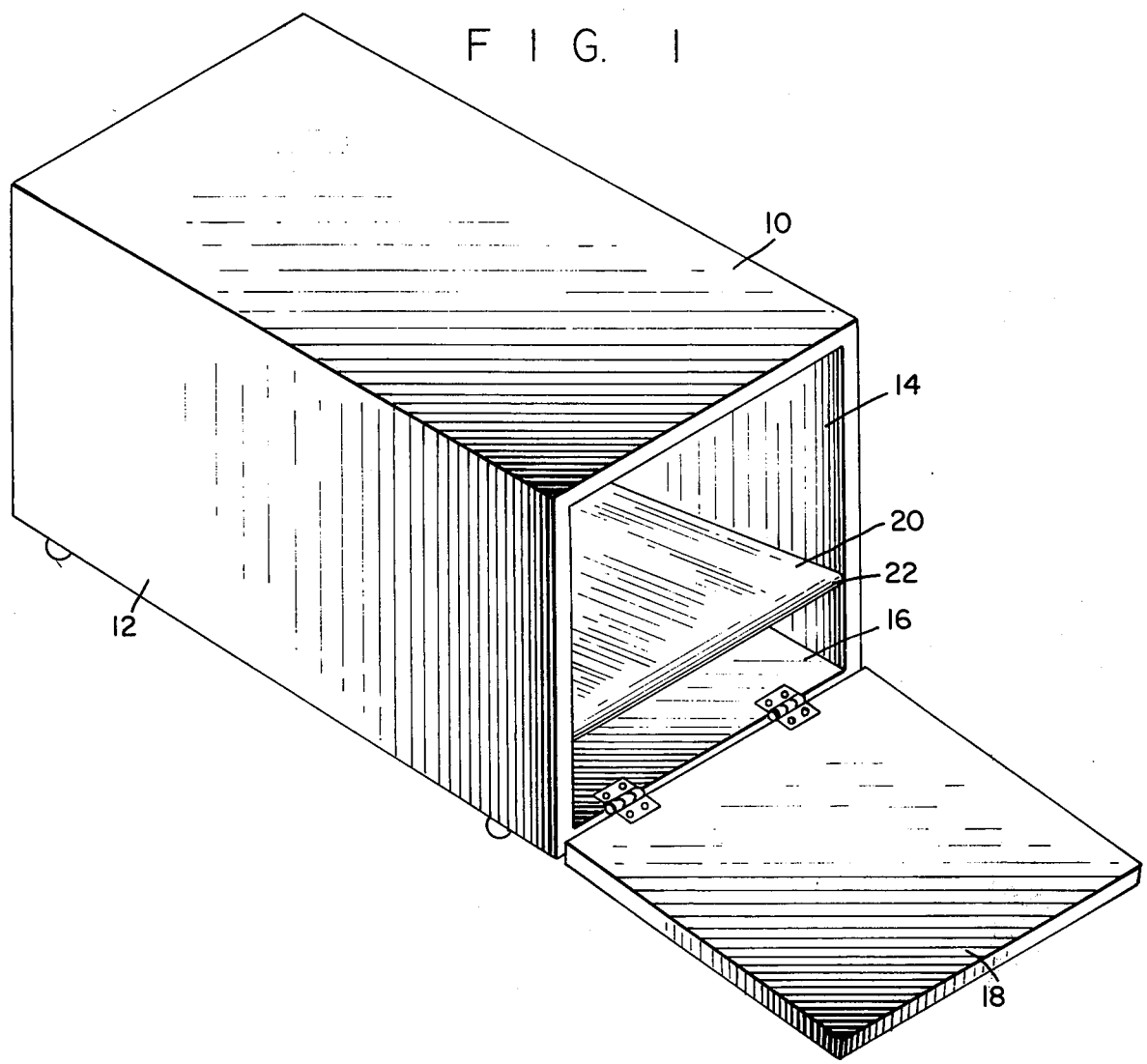
FIG. 1 is a perspective view illustrating the bread box when open.

At the lower end of the walls 12,14 there is pivoted in the usual manner a door closure generally indicated at 18. This is shown open in FIG. 1 and closed in FIG. 2. No lock is shown but any well-known snap lock, magnet etc. can be used as usual to hold the door closed in the position shown in FIG. 2.

Figure 2:
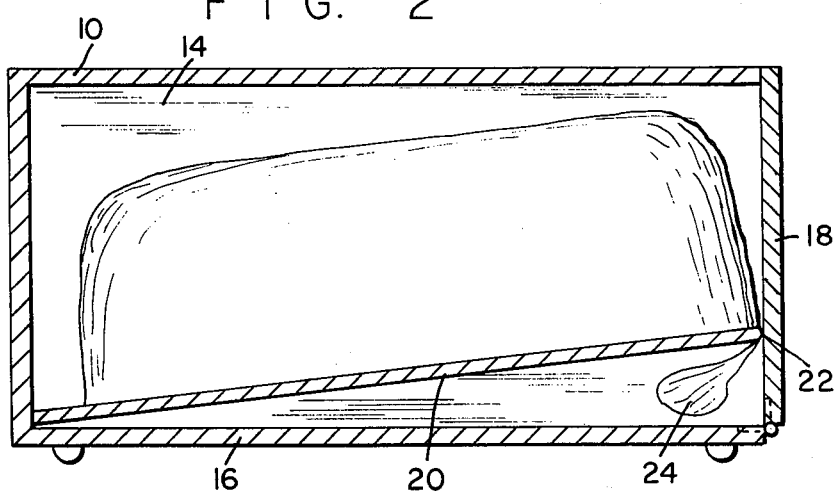
FIG. 2 is a cross-sectional view illustrating the bread box closed with the bread in position.

A shelf or floor 20 is provided within the bread box, this being located at an angle as clearly shown in FIG. 2 and being fastened to side walls 12,14 in any way desired. It may even be removable as being mounted on slides, etc. However the floor 20 terminates at 22 substantially even with the forward side edges of side walls 12,14 so that when the door 18 is closed it tightly abuts the forward edge portion 22 forming a ceiling relationship therewith.

Under these circumstances the user places the bread in the box as shown in FIG. 2 with the forward end 24 of the usual plastic or other wrapper extending out of the opening. This extension 24 is then merely tucked with the fingers under the floor 20 and the door 18 is then closed sealing the wrapper and keeping the bread fresh. The floor is positioned above the lower edges of the side walls and door to provide a pocket for this purpose.

The floor 20 need not necessarily be inclined as it could be parallel to the floor 16 without departing from the scope of the invention but there is an advantage to having this floor inclined and that is that the slices of bread tend to fall backwards toward the rear or into the package rather than tending to fall out of the package before the leading end 24 of the package can be tucked under as shown in FIG. 2. This makes it quicker and easier to operate the bread box in the preferred manner.

It is possible to apply this invention to an already existing bread box. One way is by applying the slanted floor in the position shown in an already existing bread box directly between side walls thereof; and another modification is to provide auxilliary side walls and interveneing floor which may be placed into the already existing bread box.

I claim:

1. A container comprising a top, side walls, bottom, an open front, and a movable door for closing the open front, a floor, said floor having a forward edge located above the lower edges of the side walls and abutting the interior surface of the door when in closed position closing the open end of the container, whereby material in an opened ended wrapper may be placed on the floor and the open end of the wrapper tucked in under the floor, the door sealingly abutting the floor edge and wrapper when closed.

2. The container of claim 1 wherein said floor is inclined.

3. The container of claim 1 wherein said floor is inclined downwardly towards the rear away from the front opening.

* * * * *